US009761264B2

(12) United States Patent
Nagasawa et al.

(10) Patent No.: US 9,761,264 B2
(45) Date of Patent: Sep. 12, 2017

(54) OPTICAL INFORMATION RECORDING/REPRODUCING DEVICE

(71) Applicant: HITACHI-LG DATA STORAGE, INC., Tokyo (JP)

(72) Inventors: Mitsuru Nagasawa, Tokyo (JP); Kazuyoshi Yamazaki, Tokyo (JP); Kenichi Shimada, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 27 days.

(21) Appl. No.: 15/137,352

(22) Filed: Apr. 25, 2016

(65) Prior Publication Data

US 2016/0322077 A1 Nov. 3, 2016

(30) Foreign Application Priority Data

Apr. 28, 2015 (JP) ................. 2015-090999

(51) Int. Cl.
*G11B 7/0065* (2006.01)
*G11B 7/1369* (2012.01)
*G11B 7/1381* (2012.01)
G11B 7/0037 (2006.01)
G11B 7/00 (2006.01)

(52) U.S. Cl.
CPC .......... *G11B 7/1369* (2013.01); *G11B 7/1381* (2013.01); *G11B 7/0037* (2013.01); *G11B 7/0065* (2013.01); *G11B 2007/0009* (2013.01)

(58) Field of Classification Search
None
See application file for complete search history.

(56) References Cited

U.S. PATENT DOCUMENTS

| 2006/0232841 | A1* | 10/2006 | Toishi | G11B 7/0065 359/24 |
| 2009/0040903 | A1* | 2/2009 | Tokuyama | G11B 7/0065 369/103 |
| 2010/0061203 | A1* | 3/2010 | Kim | G11B 7/083 369/44.23 |

FOREIGN PATENT DOCUMENTS

JP 2014-032727 A 2/2014

* cited by examiner

*Primary Examiner* — Brian Butcher
(74) *Attorney, Agent, or Firm* — Volpe and Koenig, P.C.

(57) ABSTRACT

A light information recording/reproducing apparatus can improve the optical efficiency of an optical system at the time of reproduction to thereby improve the reproduction transfer rate. An optical element (for example, an optical isolator), which removes a return light beam of a light beam, is arranged such that the light beam passes through the optical element at the time of recording information in an optical information recording medium and such that the light beam does not pass through the optical element at the time of reproducing information from the optical information recording medium.

8 Claims, 14 Drawing Sheets

OPTICAL INFORMATION RECORDING/REPRODUCING DEVICE

INCORPORATION BY REFERENCE

The present application claims priority from Japanese application JP 2015-090999 filed on Apr. 28, 2015, the content of which is hereby incorporated by reference into this application.

BACKGROUND OF THE INVENTION (1) Field of the Invention

The present invention relates to an optical information recording/reproducing apparatus which records, as page data, information of a pattern of interference between signal light and reference light in an optical information recording medium and reproduces the information from the optical information recording medium.

(2) Description of the Related Art

As a hologram recording/reproducing technique, there is, for example, JP-A-2014-32727. In this publication, it is described that an object is "to provide a hologram optical pickup apparatus and a light information recording/reproducing apparatus which can perform high-quality data reproduction and high-speed recording/reproduction by reducing light loss and improving light use efficiency". Also, it is described that "the resolution means includes: a light source that emits a light beam; a splitting element that splits the light beam emitted from the light source into a signal light beam and a reference light beam; an angle changing element that changes the angle of the reference light beam incident on an optical information recording medium; a spatial light modulator that adds information to the signal light beam; an objective lens that irradiates the optical information recording medium with the signal light beam; and an imaging element that detects a diffracted light beam generated from a recording region in the optical information recording medium when the optical information recording medium is irradiated with the reference light beam". Further, it is described that "the resolution means includes an optical element capable of shaping the light flux of the reference light beam into a desired shape and/or a desired light flux diameter, and the light flux shape and/or the light flux diameter of the reference light beam irradiating the optical information recording medium can be controlled by controlling the light flux shape and/or the light flux diameter with the optical element".

SUMMARY OF THE INVENTION

In the hologram recording/reproducing technique, as means for increasing the transfer rate in recording and reproduction, there is means for improving the optical efficiency of the hologram optical system. In the technique described in JP-A-2014-32727, the light flux of the reference light beam is shaped into a desired shape or a desired light flux diameter by using a beam shaper, a beam expander lens, or the like, so that only the region which contributes to the hologram formed by the signal light beam is irradiated. Thereby, the optical efficiency is improved.

However, in the hologram recording/reproducing apparatus, it is required to further increase the transfer rate. Especially, there is a case where a user wants to instantaneously read information storing in an archive, and hence it is an important problem to improve the reproduction transfer rate. The present optical system includes many optical elements which reduce the optical efficiency, and hence it is necessary to improve the optical efficiency by optimally arranging the optical elements.

The present invention has been made in view of the above-described problem. An object of the present invention is to provide a light information recording/reproducing apparatus which can improve the optical efficiency of the optical system at the time of reproduction to thereby improve the reproduction transfer rate.

The above-described problem is solved by, for example, the invention described in the scope of the claims. This application includes a plurality of means to solve the above-described problem. As an example of these, a light information recording/reproducing apparatus, which uses holography to record and reproduce information into and from an optical information recording medium, is configured by including: a light source that emits a light beam; a light splitting element that makes the light beam split into a first optical path through which the light beam passes at the time of recording information, and a second optical path through which the light beam passes at the time of reproducing information; a first optical system that is arranged on the first optical path and includes an optical isolator by which a part of the light beam emitted from the light source is prevented from returning to the light source; and a second optical system that is arranged on the second optical path, and is configured such that, by the light splitting element, the optical system through which the light beam passes is switched to the first optical system or the second optical system at the time of recording or reproduction.

With the present invention, it is possible to provide an optical pickup apparatus, and a light information recording/reproducing apparatus provided with the optical pickup apparatus in which, in an optical system, the optical efficiency of reference light at the time of reproduction is improved more than the optical efficiency of the reference light at the time of recording, and thereby the reproduction transfer rate is improved.

Other objects, features and advantages of the invention will become apparent from the following description of the embodiments of the invention taken in conjunction with the accompanying drawings.

DETAILED DESCRIPTION OF THE INVENTION

In the following, embodiments according to the present invention will be described with reference to the accompanying drawings.

Embodiment 1

Figure 1:
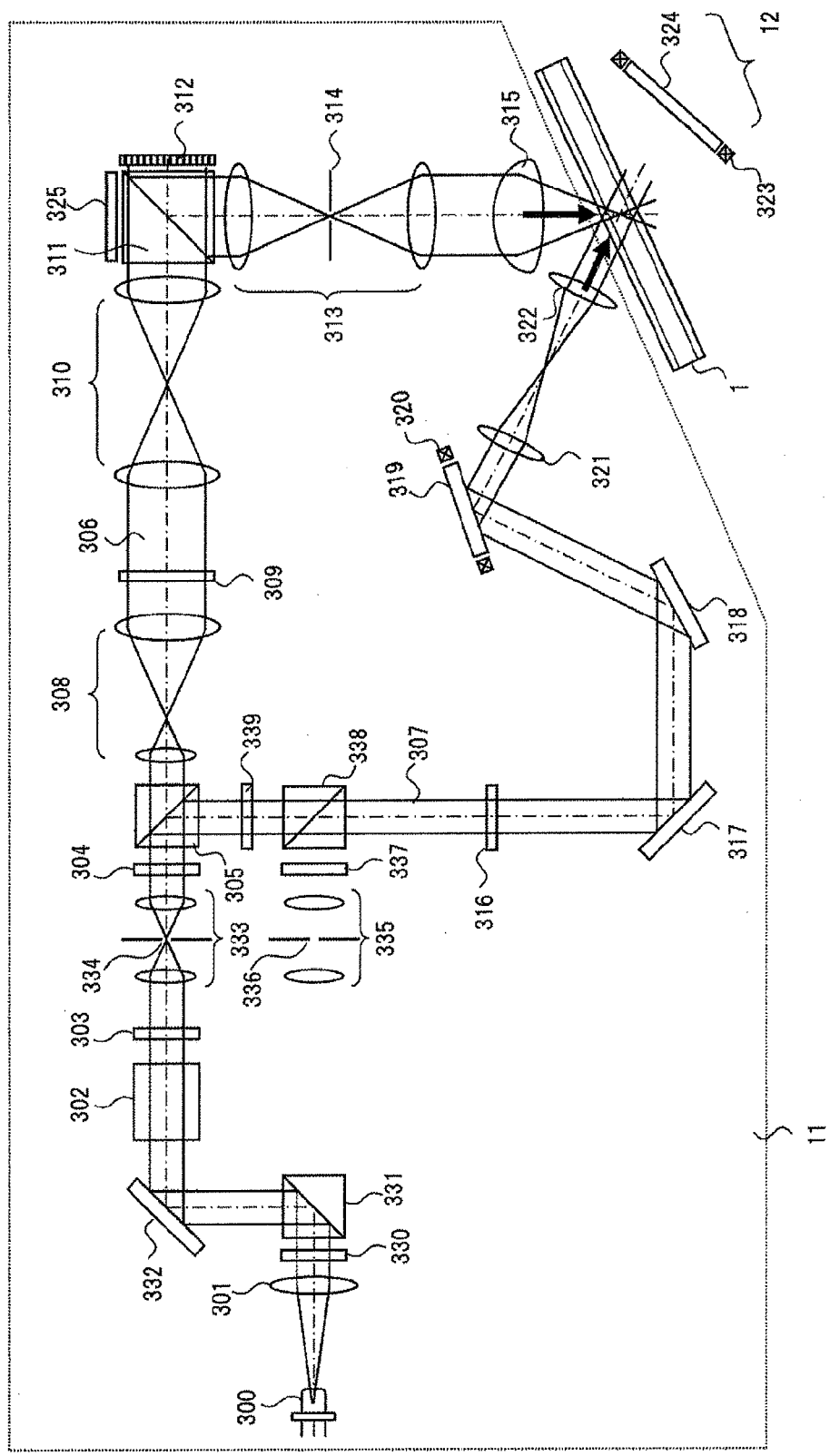
FIG. 1 is a schematic view showing a state of light beam propagation at the time of recording in a composition of an optical system of an optical pickup apparatus of Embodiment 1.

FIG. 1 shows an example a composition of an optical system of an optical pickup apparatus 11 of Example 1, and shows a state of propagation of a light beam at the time of recording. A light beam emitted a light source 300 is converted into parallel light by a collimator lens 301 and enters a ½ wavelength plate 330. The polarization of the light beam is controllable in a desired direction by the ½ wavelength plate 330 and hence is converted into polarized light which is reflected by a PBS (Polarization Beam Splitter) prism 331 at the time of recording.

The light beam, which is transmitted through the ½ wavelength plate 330 and reflected by the PBS prism 331, is reflected by a mirror 332 and then enters an optical isolator 302. The optical isolator is an element which prevents that a light beam, reflected by the surface of an optical element, and the like, returns to the light source. Since, when the return light beam enters the light source, the oscillation state of light becomes unstable, the interference condition between the signal light beam and the reference light beam is changed, and thereby a good hologram cannot be formed. The optical isolator serves to prevent this. The light beam passes through the optical isolator 302 and then enters a shutter 303.

When the shutter 303 is open, the light beam passes through the shutter 303, and passes through a relay lens 333 and a pinhole 334. The relay lens 333 and the pinhole 334 work on removing high frequency noise components of the light source 300. In the light source 300, the ideal Gaussian intensity distribution is varied in intensity in a high-frequency area by the influence of a defect of an optical component, dust, and the like. The intensity variation of high frequency components becomes a noise factor in forming a hologram. Therefore, when the light beam is condensed by the relay lens 333 as shown in FIG. 1, the low-frequency components of the ideal Gaussian intensity distribution, or the like, is concentrated at the center of the optical axis, while the high frequency components are concentrated at a position shifted by a predetermined amount from the center of the optical axis. The high frequency components can be removable by arranging the pinhole 334 having an effective diameter suitable for the position.

For example, by an optical element 304 configured by a ½ wavelength plate, or the like, the polarization direction of the light beam, the high frequency components of which are removable, is controlled so that the light quantity ratio between P-polarized light and S-polarized light of the light beam becomes a desired ratio, and then the light beam enters a PBS prism 305.

The light beam transmitted through the PBS prism 305 serves as a signal light beam 306. The optical beam diameter of the light beam is expanded by a beam expander 308. Then, the light beam is transmitted through a phase mask 309, a relay lens 310, and a PBS prism 311, and enters a spatial light modulator 312.

The signal light beam, to which information is added by the spatial light modulator 312, is reflected by the PBS prism 311, and propagates through a relay lens 313 and a spatial filter 314. Then, the signal light beam is condensed into an optical information recording medium 1 by an objective lens 315.

On the other hand, the light beam reflected by the PBS prism 305 serves as a reference light beam 307, and is converted, by a ½ wavelength plate 339, into polarized light transmitted through a PBS prism 338, and is transmitted through the PBS prism 338. Then, by a polarization direction conversion element 316, the light beam is set in a predetermined polarization direction according to the time of recording or regeneration, and enters a galvano mirror 319 via a mirror 317 and a mirror 318. The angle of the galvano mirror 319 can be adjusted by an actuator 320, and hence the incident angle of the reference light beam, which enters the optical information recording medium 1 after passing through a lens 321 and a lens 322, can be set to a desired angle. It should be noted that, instead of the galvano mirror, an element, which converts the wave face of the reference light beam, may be used for setting the incident angle of the reference light beam.

In this way, since the signal light beam and the reference light beam enter the optical information recording medium 1 so as to overlap each other, an interference fringe pattern is formed in the optical information recording medium 1, and the pattern is written in the recording medium so that information is recorded. Further, when the incident angle of the reference light beam, which enters the optical information recording medium 1, is changed by the galvano mirror 319, angle-multiplexing recording can be performed.

Figure 2:
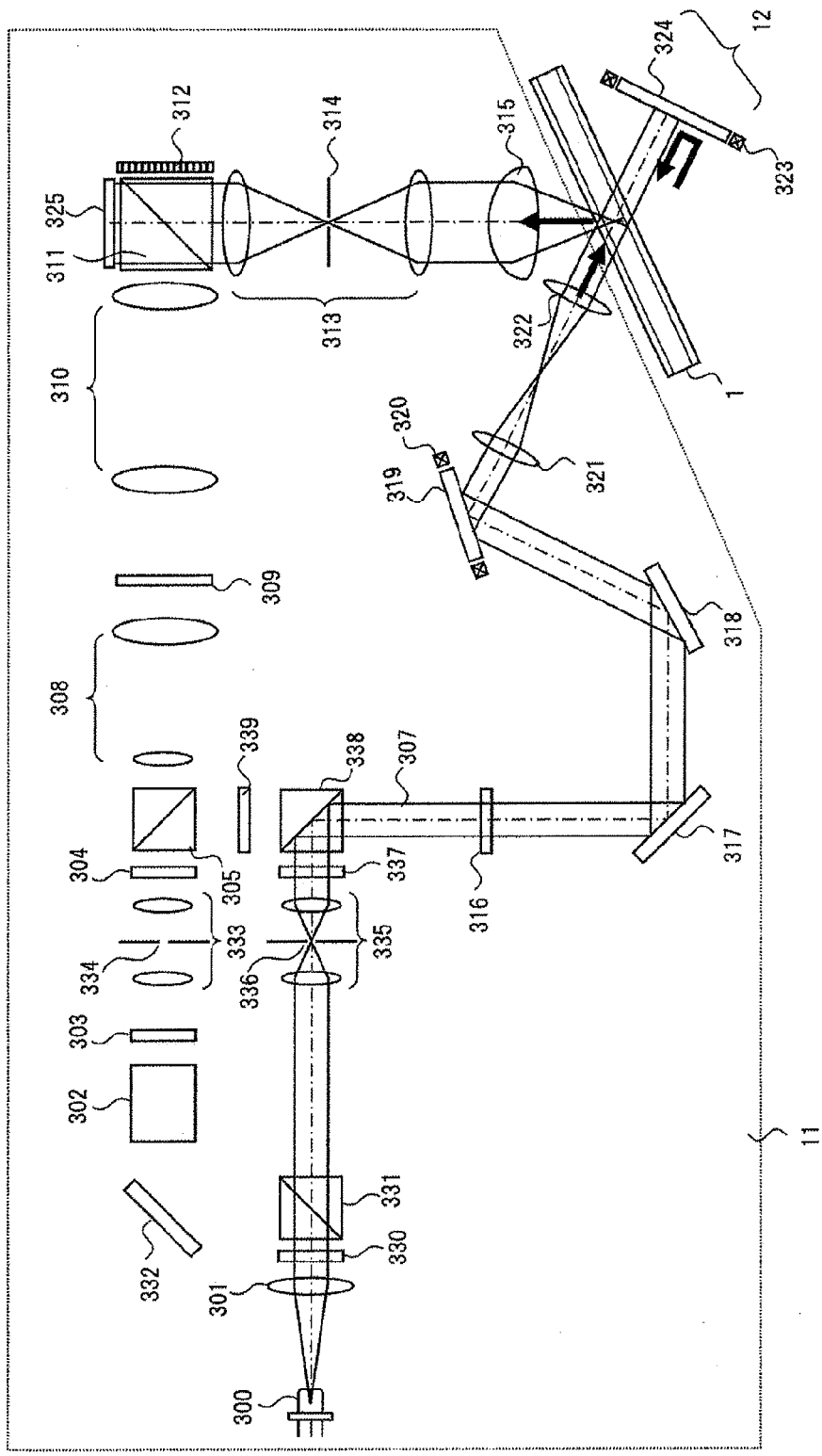
FIG. 2 is a schematic view showing a state at the time of reproduction in a composition of the optical system of the optical pickup apparatus of embodiment 1.

FIG. 2 shows a state of propagation of light beam at the time of reproduction in the optical pickup apparatus 11 of Example 1. When the recorded information is reproduced, the light beam passing through the collimator lens 301 is converted, by rotating the ½ wavelength plate 330, into polarized light in the direction perpendicular to the direction at the time of recording, so as to be transmitted through the PBS prism 331. After the high frequency noise components of the light beam transmitted through the PBS prism 331 are removed by the relay lens 335 and the pinhole 336, the light beam is again converted into polarized light in the predetermined direction by the ½ wavelength plate 337 and is reflected by the PBS prism 338.

Then, the light beam passes, as the reference light beam 307, through the optical path and enters the optical information recording medium 1. The light beam transmitted through the optical information recording medium 1 is then reflected by a galvano mirror 324, an angle of which can be adjusted by an actuator 323, so that a reproduction reference light beam is generated.

The reproduction light beam reproduced by the reproduction reference light beam passes through the objective lens 315, the relay lens 313, and the space filter 314. Then, the reproduction light beam transmitted through the PBS prism 311 and enters a photodetector 325, so that the recorded signal can be reproduced. As the photodetector 325, an imaging element, for example, such as a CMOS image sensor, and a CCD series, can be used, but any element may be used as far as it can reproduce the page data.

In this way, in the present embodiment, the optical system is configured such that the light beam passes through the optical isolator 302 at the time of recording, and such that the light beam does not pass through the optical isolator at the time of reproduction. The effects of the configuration of the optical system will be described below.

The optical isolator is configured by two polarizers, and a faraday element which rotates the polarization direction. The loss of light quantity depends on the performance of the optical isolator, but, for example, in the case of isolation of about 30 dB, the loss of light quantity of the optical isolator is about 20%, and hence the isolation hinders improvement of the transfer rate. Therefore, it is necessary to remove the optical isolator in order to improve the optical efficiency and to thereby improve the transfer rate. However, when the optical isolator is removed, the degree of modulation of interference fringes formed by the signal light beam and the reference light beam is reduced, and hence it is difficult to remove the optical isolator at the time of recording. On the other hand, the interference fringes are not formed at the time of reproduction, and hence it is possible to remove the optical isolator.

Figure 3:
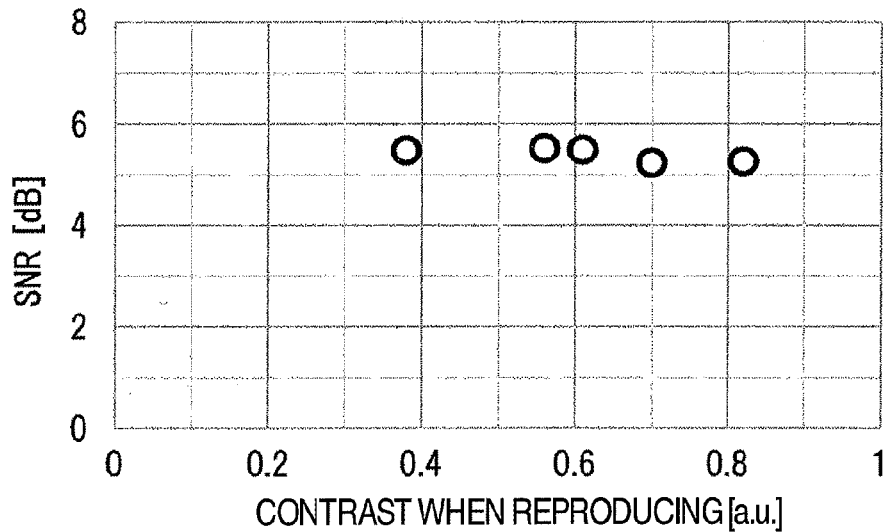
FIG. 3 is a graph showing the relationship between the contrast ratio and the SNR at the time of reproduction.

Therefore, the reproduction quality is studied with actual equipment when the oscillation state of light is changed at the time of reproduction. FIG. 3 is a graph obtained by actual measurement of the relationship between the contrast ratio and the SNR of the reproduced signal at the time of reproducing the light beam. The contrast ratio represented by the horizontal axis is an indicator showing the degree of modulation of interference fringes of the light beam. Generally, there is a feature that, when the amount of return light beam is small, the oscillation state of the light beam is stable. Thereby, the degree of modulation of interference fringes is high, so that the contrast ratio becomes large. On the other hand, when the amount of return light beam is large, the oscillation state of the light beam is unstable. Thereby, the degree of modulation of interference fringes is low, so that the contrast ratio becomes small.

Figure 4:
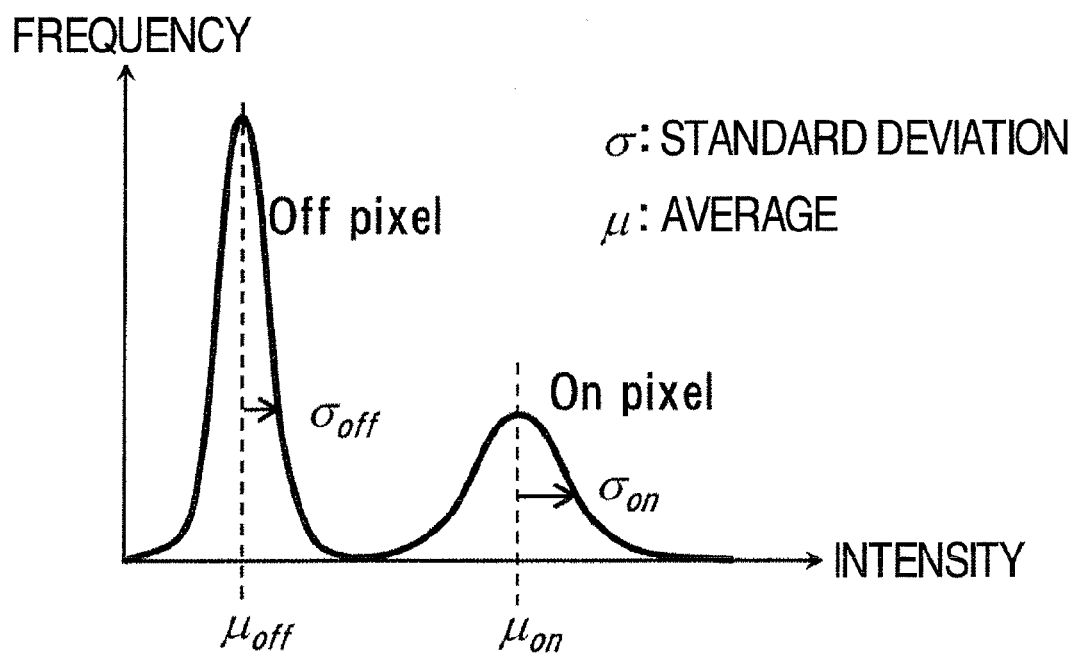
FIG. 4 is a graph showing the relationship between the intensity and the frequency of each of an ON pixel and an OFF pixel.

The SNR represented by the vertical axis is an indicator showing the reproduction quality of the reproduced hologram and is defines by FIG. 4 and expression 1. FIG. 4 is a graph showing the relationship between the intensity and frequency of recorded two dimensional data. Hologram data are generally represented by on-pixel and off-pixel values of "1" and "0" and, as shown in FIG. 4, have predetermined distributions, respectively. When the average of the intensity of on-pixel is defined as $\mu_{on}$, and the standard deviation of on-pixel is defined as $\sigma_{on}$, and when the average of the intensity of off-pixel is defined as $\mu_{off}$, and the standard deviation of off-pixel is defined as $\sigma_{off}$, the definitional expression of SNR can be represented by expression 1, and the reproduction quality can be quantitatively evaluated by expression 1.

$$SNR = 20 \log_{10}\left(\frac{\mu_{on} - \mu_{off}}{\sigma_{on} + \sigma_{off}}\right) \qquad < \text{Equation 1} >$$

From FIG. 3, it can be seen that, at the time of reproduction, even when the contrast ratio becomes small, the degradation of SNR is not observed. When the optical isolator is removed, the contrast ratio is at least about 0.4, and the SNR at this time is about 5.5 dB. These levels can be sufficiently tolerated in consideration of the tolerance of the whole system in the hologram recording/reproducing apparatus. Therefore, the optical isolator is an optical element indispensable only at the time of recording, and can be removed at the time of reproduction.

As described above, in the present invention, as shown in FIG. 1 and FIG. 2, the optical system is configured such that, at the time of recording, the light beam passes through the optical path with the optical isolator, and such that, at the time of reproduction, the light beam passes through the optical path without the optical isolator. In this configuration, at the time of recording, the optical isolator 302 can prevent the generation of return light due to reflection by the optical elements, and thereby the recording performance of hologram can be improved by increasing the contrast ratio. On the other hand, the loss of the light beam is not generated at the time of reproduction. Therefore, the transfer rate at the time of reproduction can be substantially improved, and the degradation of the contrast ratio at the time of reproducing the light beam is not caused due to the SNR, as a result of which it is possible to maintain the high reproduction quality.

Embodiment 2

Figure 5:
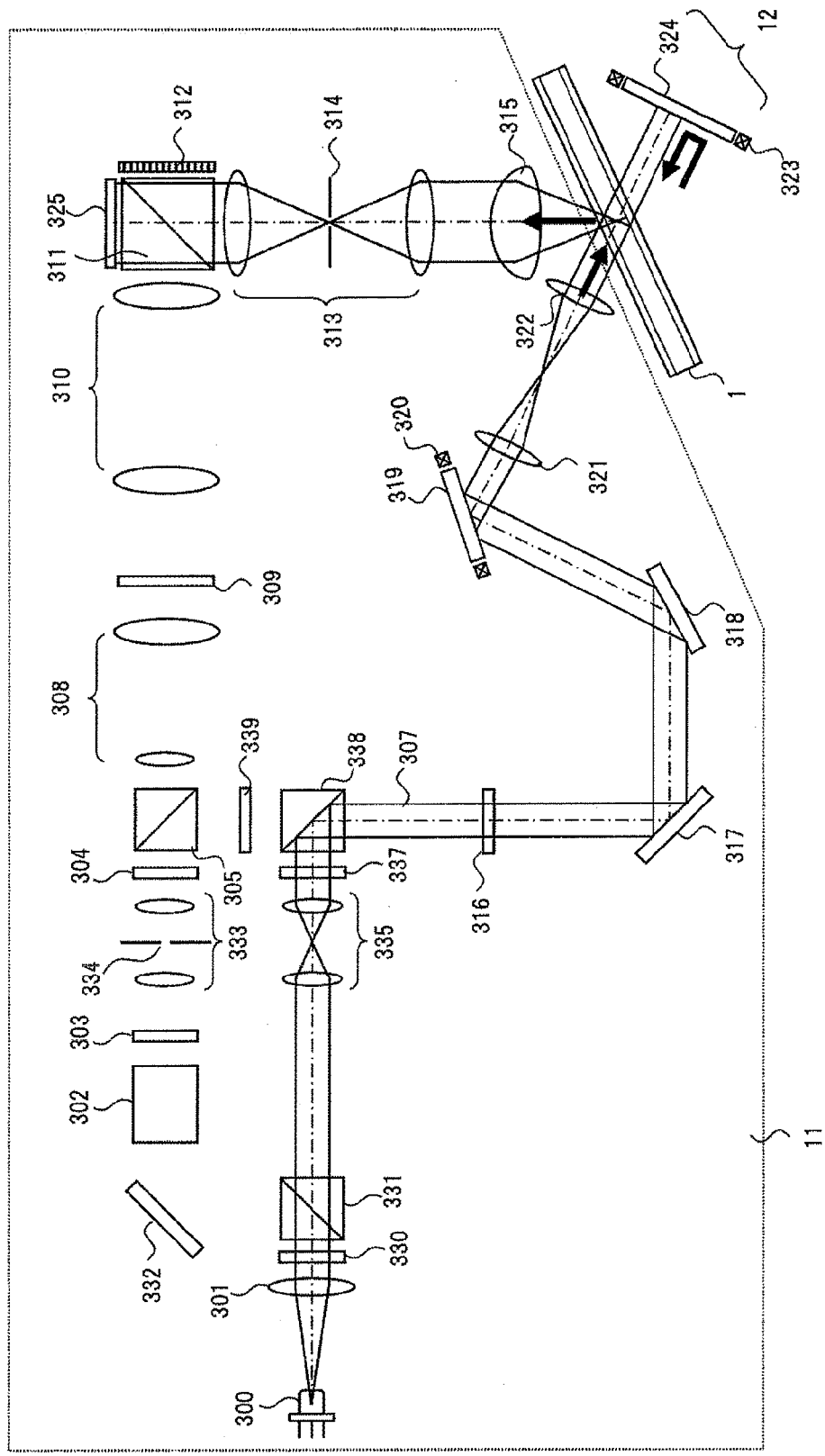
FIG. 5 is a schematic view showing a state of light beam propagation at the time of reproduction in a configuration of an optical system of an optical pickup apparatus of Embodiment 2.

FIG. 5 shows a second form of a configuration of an optical system of the optical pickup apparatus 11. Embodiment 2 is different from Embodiment 1 in that, at the time of reproduction, the relay lens 335, through which the light beam passes, is not provided with the pinhole 336. FIG. 5 shows a state of propagation of the light beam at the time of reproduction, and the propagation path of the light beam at the time of recording is the same as that in Embodiment 1.

Figure 6:
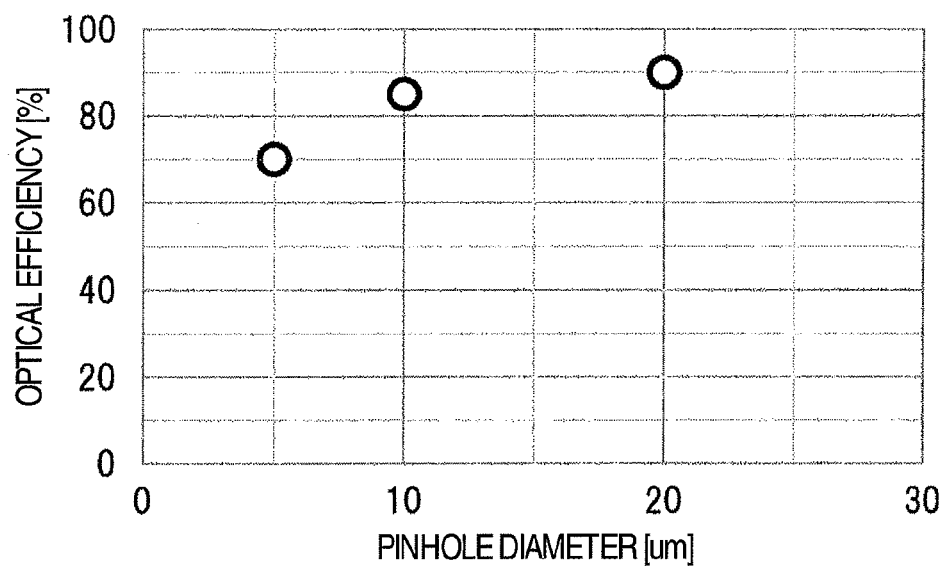
FIG. 6 is a graph showing the relationship between the pinhole diameter and the optical efficiency.

The pinhole can remove high frequency noise components, but on the other hand, has a problem of lowering the optical efficiency. FIG. 6 shows the result obtained when the optical efficiency of each of the pinholes having a plurality of diameters is measured. The vertical axis represents the relative values of optical efficiency in the case where the value of optical efficiency is set to 100% at the time when the light beam does not pass through the pinhole pass. In the optical system used for the present study, the diameter of the pinhole, which enables desired high frequency noise components to be removed, is 10 μm. At this time, the optical efficiency is reduced to about 85%, and the light quantity loss of 15% is generated. Therefore, there is a problem in improving the transfer rate. As the diameter of the pinhole is increased, the optical efficiency is improved. Therefore, in view of improving the transfer rate, it is desired that the pinhole is not provided.

However, when the pinhole is not provided at the time of recording, the intensity uniformity of the light beam is deteriorated by the high frequency noise components, and hence the recording quality of the hologram generated by interference of the signal light beam and the reference light beam is degraded. On the other hand, it is considered that, at the time of reproduction, the hologram is not generated with the reference light beam, and hence the pinhole can be removed. Therefore, the influence of the diameter of the pinhole on the reproduction quality at the time of reproduction is estimated.

Figure 7:
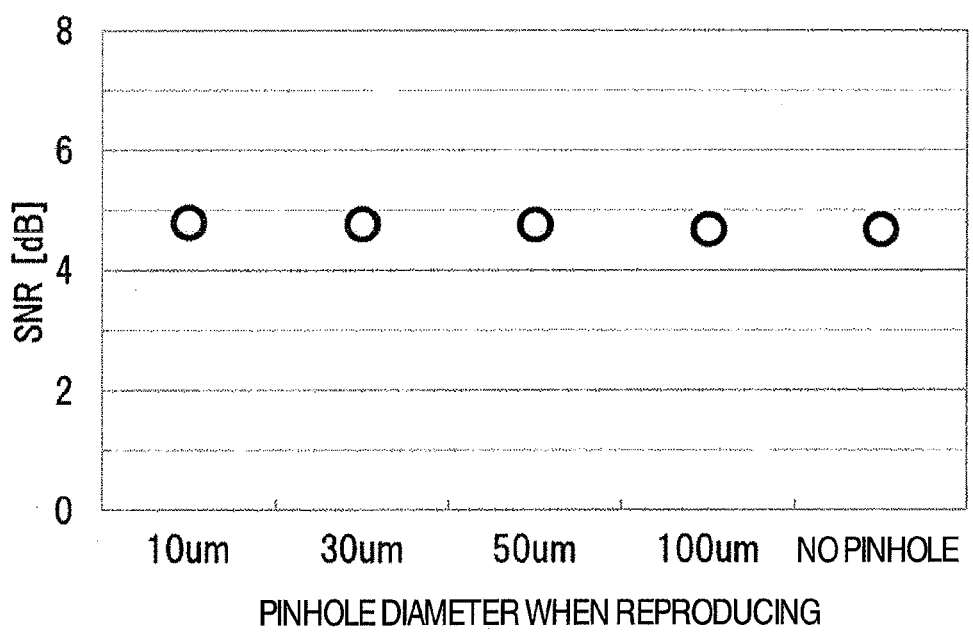
FIG. 7 is a graph showing the relationship between the pinhole diameter and the SNR at the time of reproduction.

FIG. 7 is a graph showing estimation of SNR at the time when the diameter of the pinhole is changed at the time of reproduction. As main optical parameters used in the calculation, the wavelength of the light beam is set as $\lambda=405$ nm, NA of the objective lens is set as NA=0.65, and the pixel pitch of the spatial light modulator is set to 7.8 µm. From FIG. 7, it can be seen that, at the time of reproduction, even when the diameter of the pinhole is increased, the deterioration quantity of SNR is small. Therefore, at the time of reproduction, it can be said that the pinhole can be removed.

As described above, in the present invention, as shown in FIG. 5, the optical system may be configured such that, at the time of reproduction, the light beam passes through the optical path without the optical isolator and without the pinhole. With this configuration, the light loss due to the optical isolator 302 and the pinhole is not generated at the time of reproduction, and hence the transfer rate at the time of reproduction can be substantially improved, and the high reproduction quality can be maintained.

It should be noted that, in addition to the role of condensing the light beam at the pinhole 336, the relay lens 335 is provided with a function of expanding and reducing the diameter of the light flux of the light beam. Therefore, at the time of the optical system in which the light flux diameter is not changed, it is not always necessary to mount the relay lens 335. For example, the optical system, to which the relay lens 335 is not mounted, may also be used. The relay lens is configured by a plurality of lenses corresponding to chromatic aberration. Therefore, when the relay lens is used, the optical efficiency is reduced to 90%, and thereby the light quantity loss of 10% is caused, which results in a problem in improving the transfer rate. However, with the optical system to which the relay lens 335 is not mounted, the transfer rate at the time of reproduction can be improved.

Embodiment 3

Figure 8A:
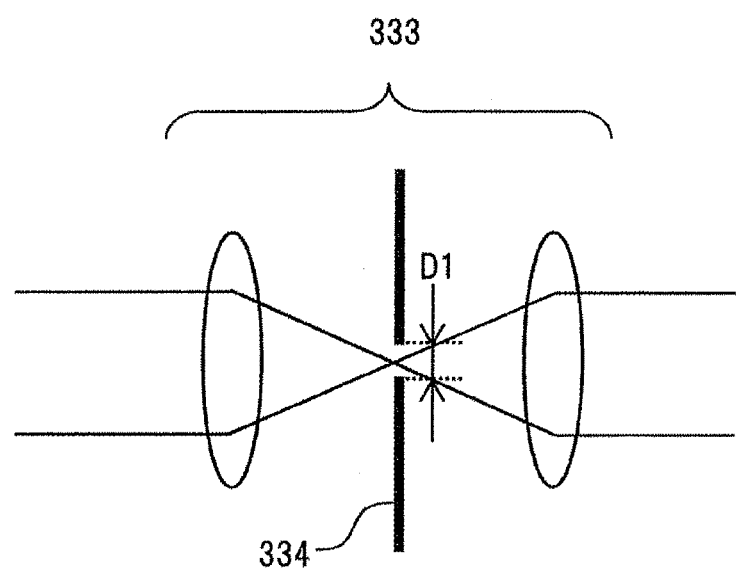
FIG. 8a is a schematic view showing the relationship between a pinhole diameter and a relay lens arranged in an optical path through which a light beam propagates at the time of recording in Embodiment 3.
Figure 8B:
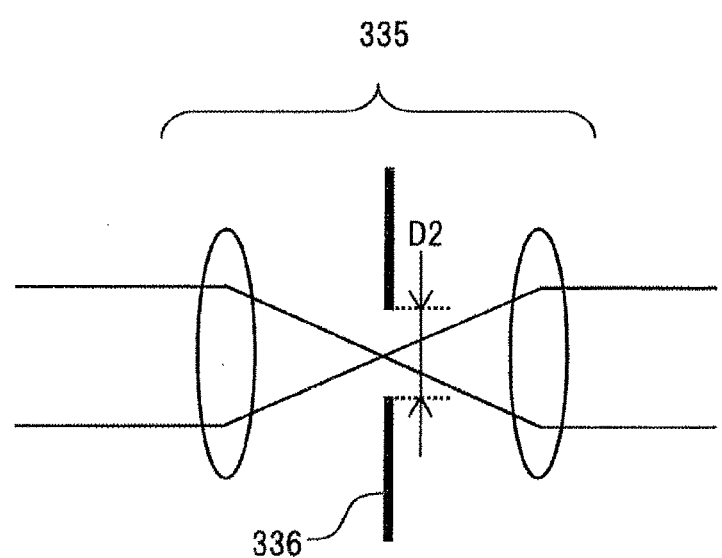
FIG. 8b is a schematic view showing the relationship between the pinhole diameter and the relay lens arranged in the optical path through which the light beam propagates at the time of reproduction in Embodiment 3.

FIGS. 8a and 8b show another form of Embodiment 1. FIG. 8a shows the relationship between the relay lens 333 and the pinhole 334 through which the light beam passing at the time of recording in the optical pickup apparatus 11 of Embodiment 1. FIG. 8b shows the relationship between the relay lens 335 and the pinhole 336 through which the light beam passing at the time of reproduction in the optical pickup apparatus 11 of Embodiment 1. The configuration of the optical system is the same as that in Embodiment 1, but the pinhole diameters of the pinhole 334 and the pinhole 336 are different in the present embodiment.

As shown in FIG. 6, when the diameter of the pinhole is large, the optical efficiency is high, and hence it is desired that the diameter of the pinhole is large. On the other hand, as shown in FIG. 7, when the diameter of the pinhole is increased at the time of reproduction, the SNR is slightly deteriorated. Therefore, in the present embodiment, the pinhole diameter D1 of the pinhole 334 at the time of recording and the pinhole diameter D2 of the pinhole 336 at the time of reproducing are different from each other so that the relationship between D1 and D2 is set as D1<D2. Thereby, in the present embodiment, the optical efficiency at the time of reproduction can be made higher than that of the conventional optical system, and thereby, it is possible to significantly suppress the amount of deterioration of SNR.

Embodiment 4

Figure 9:
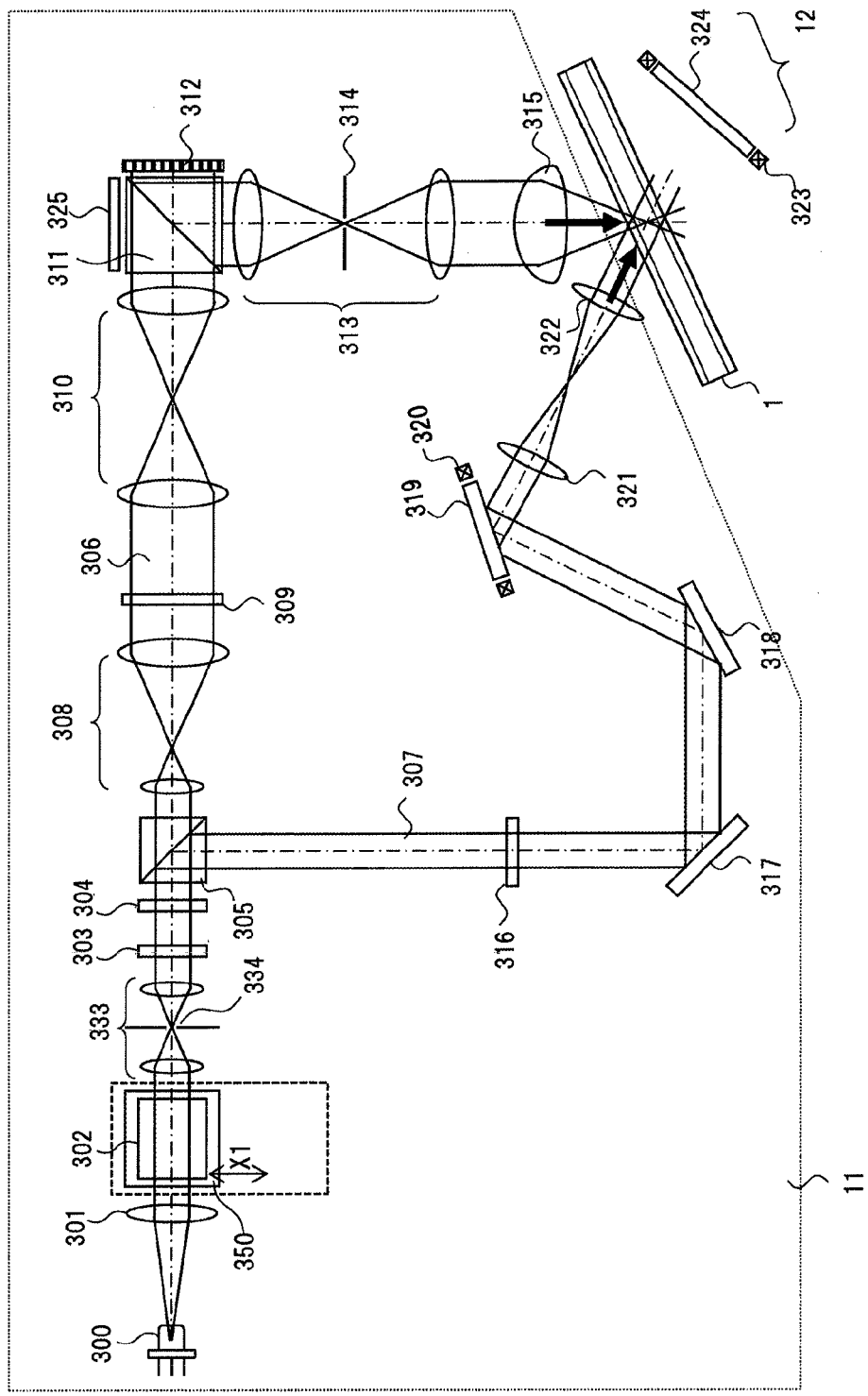
FIG. 9 is a schematic view showing a state at the time of recording in a configuration of an optical system of an optical pickup apparatus in Embodiment 4.
Figure 10:
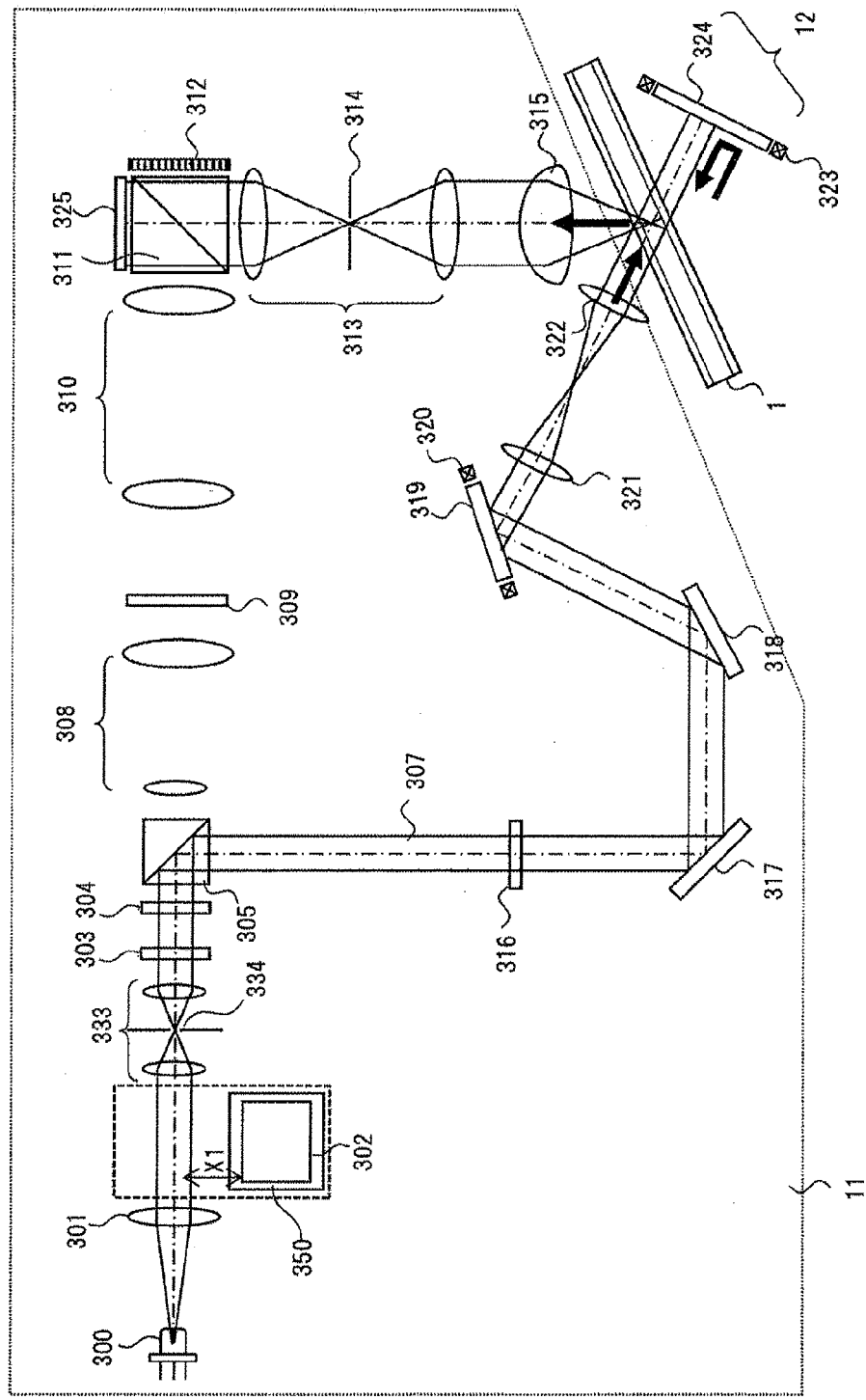
FIG. 10 is a schematic view showing a state at the time of reproduction in the configuration of the optical system of the optical pickup apparatus in Embodiment 4.

FIG. 9 and FIG. 10 show a configuration of an optical system of an optical pickup apparatus 11 in Embodiment 4. FIG. 9 shows a state of propagation of the light beam at the time of recording in the optical pickup apparatus 11 of Embodiment 4. FIG. 10 shows a state of propagation of the light beam at the time of reproduction in the optical pickup apparatus 11 of Embodiment 4. Embodiment 4 is different from Embodiments 1 to 3 in that an optical path is commonly used for recording and reproduction in order to reduce the size and cost of the optical system. On the other hand, an optical isolator drive mechanism 350, which changes the position of the optical isolator 302, is provided in Embodiment 4. The optical isolator drive mechanism 350 has a function of driving the optical isolator 302 in the X1 direction in the area shown by the broken lines in FIG. 9 and FIG. 10.

At the time of recording, the optical isolator drive mechanism 350 controls to move the optical isolator 302 to be on the optical axis of the light beam as shown in FIG. 9. The return light beam reflected by the optical elements between the optical isolator 302 and the optical information recording medium 1 is suppressed by the optical isolator 302, and hence the recording quality of the recorded hologram can be improved.

At the time of reproduction, the optical isolator drive mechanism 350 controls to move the optical isolator 302 in the X1 direction, and thereby is arranged at the position separated from the optical axis of the light beam as shown in FIG. 10. Thereby, the light loss due to the optical isolator 302 is removed, and hence the transfer rate can be substantially improved at the time of reproduction. Although the contrast ratio of the light beam is reduced by removing the optical isolator, the degradation of the contrast ratio at the time of reproduction does not cause the degradation of SNR as shown in FIG. 3, and hence the reproduction quality can be maintained to be high. It should be noted that the optical isolator drive mechanism 350 is described as a mechanism which drives in the vertical direction on the drawing, but the optical isolator drive mechanism 350 may have any configuration as long as the optical isolator 302 is arranged on the optical axis at the time of recording and is separated at a predetermined distance separated from the optical axis at the time of reproduction. For example, the optical isolator drive mechanism 350 may have a configuration in which the optical isolator 302 is shifted in the direction vertical to the paper surface.

Embodiment 5

Figure 11:
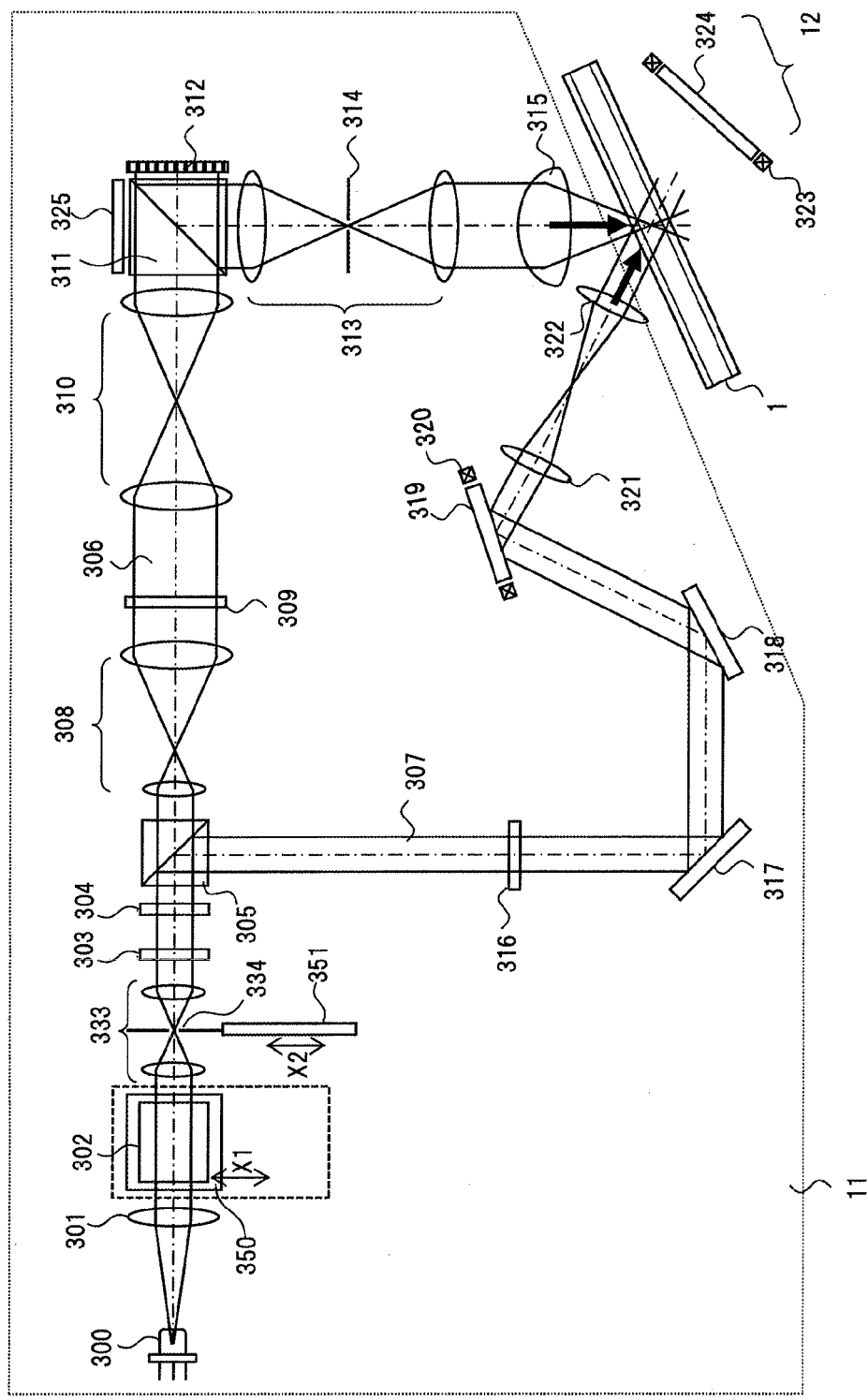
FIG. 11 is a schematic view showing a state at the time of recording in a configuration of an optical system of an optical pickup apparatus in Embodiment 5.
Figure 12:
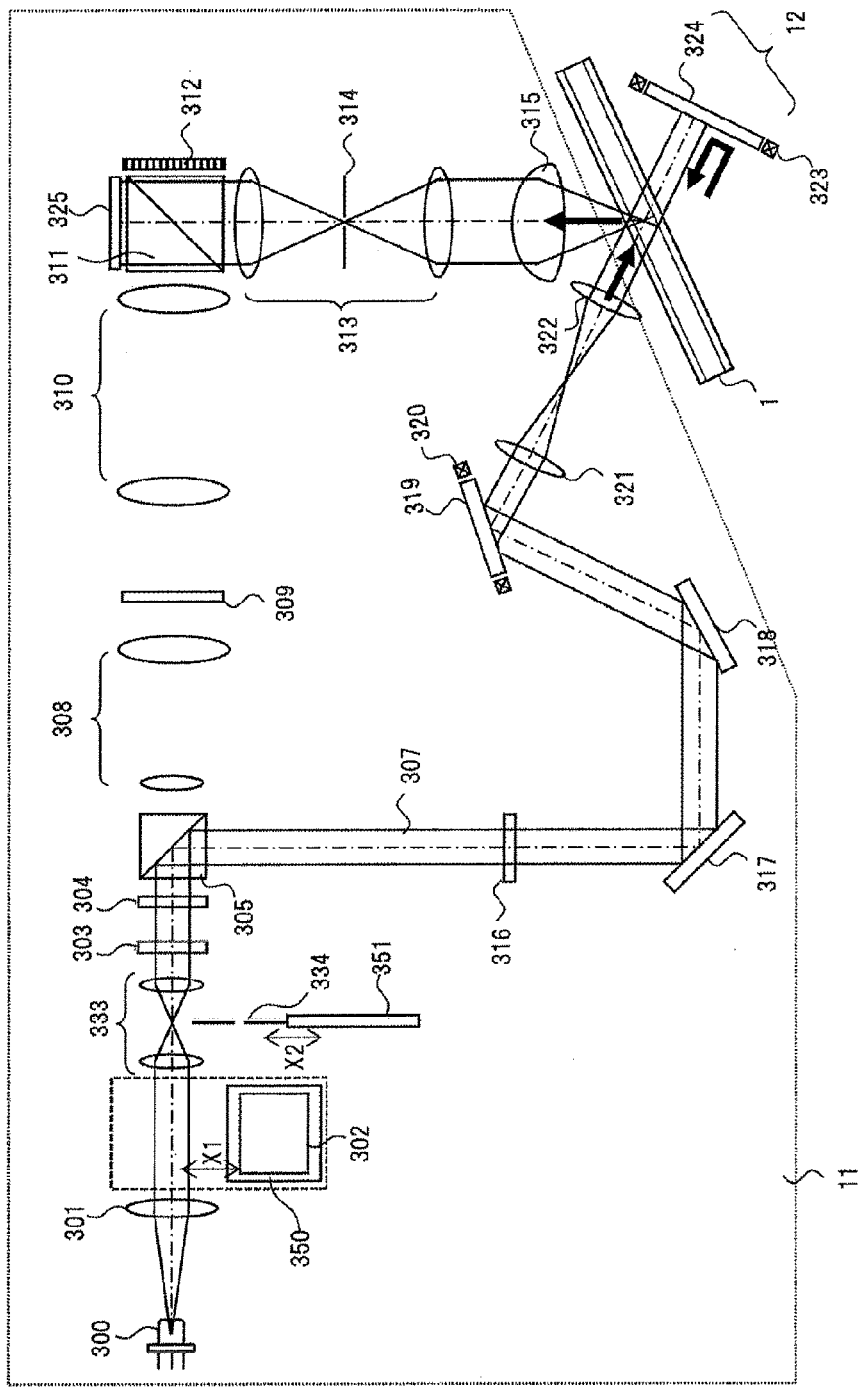
FIG. 12 is a schematic view showing a state at the time of reproduction in the configuration of the optical system of the optical pickup apparatus in Embodiment 5.

FIG. 11 and FIG. 12 show a configuration of an optical system of an optical pickup apparatus 11 of Embodiment 5. FIG. 11 shows a state of propagation of the light beam at the time of recording in the optical pickup apparatus 11 of Embodiment 5. FIG. 12 shows a state of propagation of the light beam at the time of reproduction in the optical pickup apparatus 11 of Embodiment 5. Embodiment 5 is different from Embodiment 4 in that the pinhole 334 is provided with a pinhole drive mechanism 351. The pinhole drive mechanism 351 moves the pinhole 334 in the X2 direction in FIG. 11 and FIG. 12.

At the time of recording, the optical isolator drive mechanism 350 works as shown in FIG. 11, so that the optical isolator 302 is arranged on the optical axis of the light beam and at a position at which the light beam is condensed by the relay lens 333. The return light beam generated by reflection of the optical elements can be suppressed by the optical isolator 302. The high frequency noise components of the light beam are removed by the pinhole 334, and thereby the recording quality of the recorded hologram can be improved.

At the time of reproduction, the optical isolator driving machine 350 controls to move the optical isolator 302 in the X1 direction as shown in FIG. 12, so that the optical isolator 302 is arranged at a position separated from the optical axis of the light beam. Also, the pinhole drive mechanism 351 is driven in the X2 direction so that the pinhole 334 is arranged at a position separated from the optical axis of the light beam. Thereby, the light loss due to the optical isolator 302 and the pinhole 334 is removed, and hence the transfer rate at the time of reproduction can be substantially improved more as compared with in Embodiment 6. As shown in FIG. 7, since the degradation of SNR, which is caused by removing the pinhole 334, is small, the reproduction quality can be maintained to be high.

It should be noted that, in the present embodiment, the pinhole drive mechanism 351 controls to move the pinhole 334 in the X2 direction, but the move direction is not limited to this. For example, the pinhole drive mechanism 351 may control to move the pinhole 334 in the direction vertical to the drawing, or to rotate the pinhole 334.

Embodiment 6

Figure 13A:
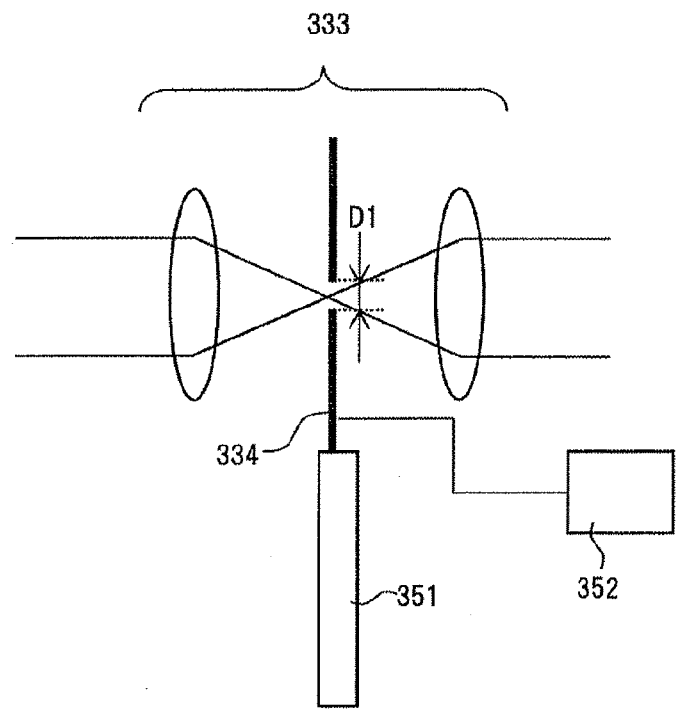
FIG. 13a is a schematic view showing the relationship between a relay lens and a pinhole diameter at the time of recording in Embodiment 6.
Figure 13B:
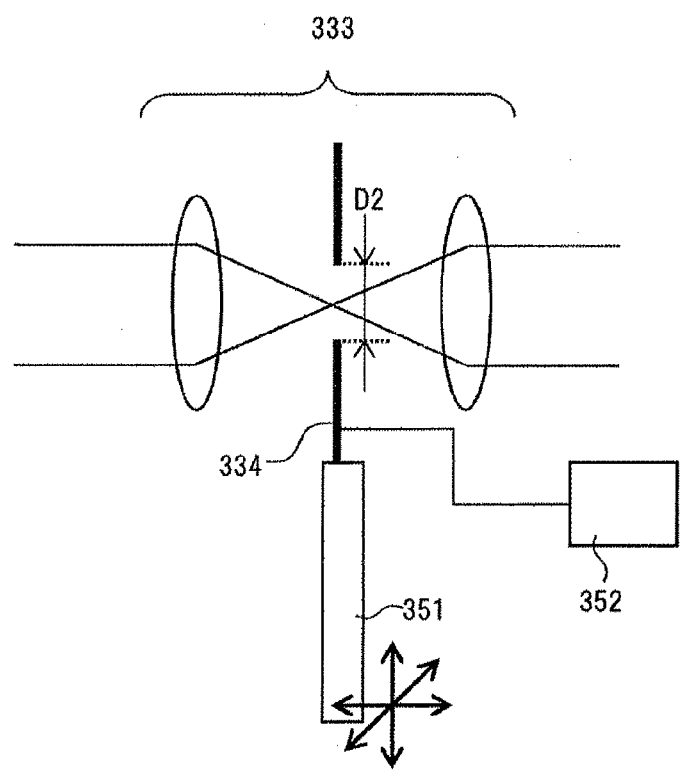
FIG. 13b is a schematic view showing the relationship between the relay lens and the pinhole diameter at the time of recording in Embodiment 6.

FIGS. 13a and 13b show another form of Embodiment 5. FIG. 13a shows the relationship between the relay lens 333 and the pinhole 334 when the light beam propagates at the time of recording in the optical pickup apparatus 11 of Embodiment 5. FIG. 13b shows the relationship between the relay lens 333 and the pinhole 334 when the light beam propagates at the time of reproduction in the optical pickup apparatus 11 of Embodiment 5. The configuration of the optical system in the present embodiment is the same as that in Embodiment 5. However, in the present embodiment, the pinhole 334 is formed as a variable pinhole whose aperture diameter can be changed, and the pinhole 334 is provided with a pinhole diameter changing drive mechanism 352 which changes the pinhole diameter of the pinhole 334 at the time of recording and at the time of reproduction.

As shown in FIG. 6, as the pinhole diameter is increased, the optical efficiency is increased, and hence the large pinhole diameter is desirable. On the other hand, as shown in FIG. 7, when the pinhole diameter is made large at the time of reproduction, the SNR is slightly deteriorated. Therefore, in the present embodiment, the pinhole 334 is configured by, for example, a mechanical aperture formed by a plurality of blades, so that the pinhole diameter changing drive mechanism 352 changes the pinhole diameter by driving the mechanical aperture with a motor.

The pinhole diameter changing drive mechanism 352 controls the pinhole 334 to have the pinhole diameter D1 at the time of recording, and controls the pinhole 334 to have the pinhole diameter D2 at the time of reproduction. At this time, the pinhole diameter has a relationship: D1<D2. Thereby, the optical efficiency at the time of reproduction is made higher than that in the conventional optical system, and also the deterioration amount of SNR can be suppressed very small. It should be noted that, when the pinhole diameter is changed, the optical axis may be slightly shifted from the center of the pinhole. To cope with this shift, the pinhole can be three-dimensionally adjusted by the pinhole drive mechanism 351.

Embodiment 7

Figure 14:
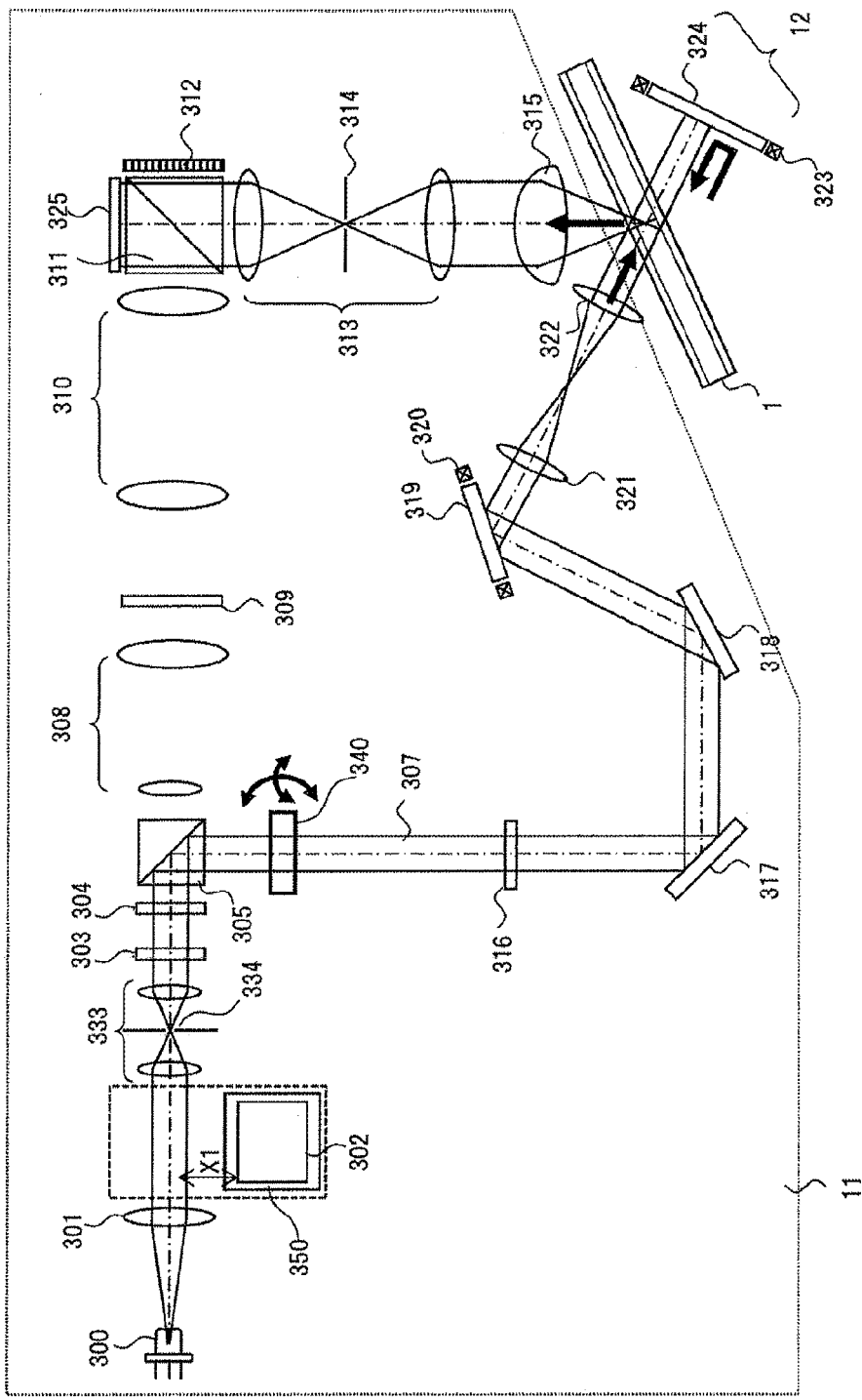
FIG. 14 is a schematic view showing a state at the time of reproduction in a configuration of an optical system of an optical pickup apparatus in Embodiment 7.

FIG. 14 shows a seventh form of the configuration of the optical system of the optical pickup apparatus 11, and shows a state of propagation of the light beam at the time of reproduction in the optical pickup apparatus 11 of Embodiment 7. The present configuration is different from the configuration in FIG. 11 in that an optical axis correction element 340 is arranged between the PBS prism 305 and the polarization direction conversion element 316.

Each of the optical systems of Embodiment 4 to Embodiment 6 is configured such that the optical isolator 302 and the pinhole 334 are driven at the time of recording and at the time of reproduction, and hence a larger shift of the optical axis may be generated as compared with the configurations in Embodiment 1 to Embodiment 5 in which the optical path is switched. Therefore, as shown in FIG. 14, the optical axis correction element 340 is arranged to correct the shift of the optical axis. The optical axis correction element 340 is configured by, for example, an optical component, such as a parallel plate or a triangular prism, and is provided with a drive mechanism which shifts and tilts the optical component by a predetermined amount. The amount of shift of the optical axis, which shift is generated when the optical path is changed at the time of recording and at the time of reproduction, is evaluated beforehand, and the optical axis correction element 340 is driven according to the shift amount evaluated beforehand. Thereby, it is possible to perform recording and reproduction while suppressing the shift of the optical axis.

Figure 15:
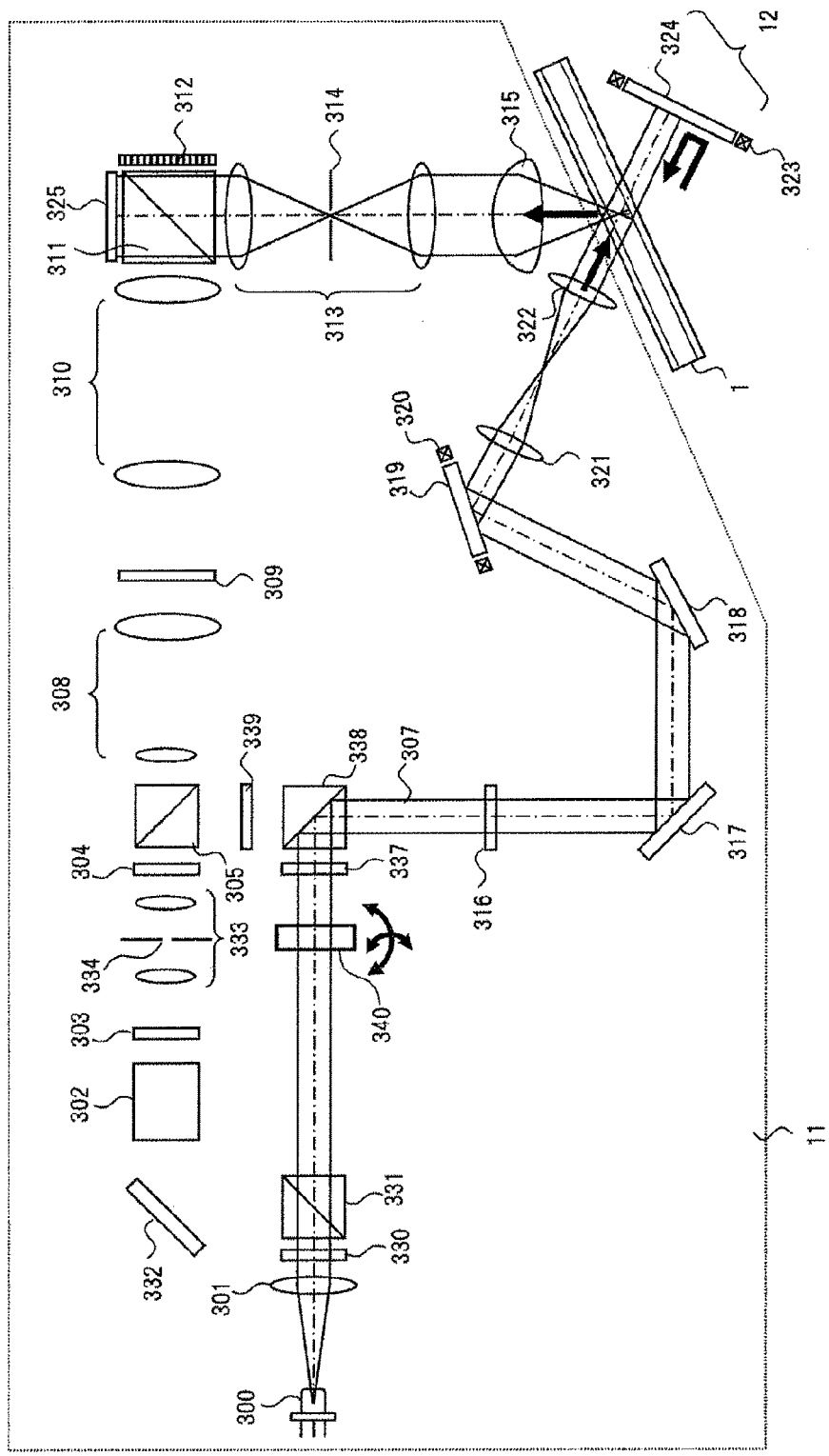
FIG. 15 is a schematic view showing another configuration of the optical system of the optical pickup apparatus of Embodiment 7.

It should be noted that, in FIG. 14, the optical axis correction element 340 is arranged on the optical path of the reference light beam, but the position of the optical axis correction element 340 is not limited to this. For example, it may be configured such that the optical axis correction element 340 is arranged on the optical path between the relay lens 333 and the PBS prism 305. Further, the optical axis correction element 340 may be mounted to the configuration of the optical system described in Embodiment 1 to Embodiment 3, in which configuration the optical path is switched between the time of recording and the time of reproduction. For example, when, as shown in FIG. 15, the optical axis correction element 340 is arranged between the PBS prism 331 and the PBS prisms 338 which are provided on the optical path for reproduction, it is possible to correct the shift of the optical axis which shift is generated by switching the optical path.

Further, for example, the shift of the optical axis may also be finely adjusted by driving the galvano mirror 319, without using the optical axis correction element 340. Further, the amount of shift of the optical axis may change with time, and hence the amount of shift may be adjusted each time when the optical path is switched between the time of recording and the time of reproduction.

Embodiment 8

Figure 16:
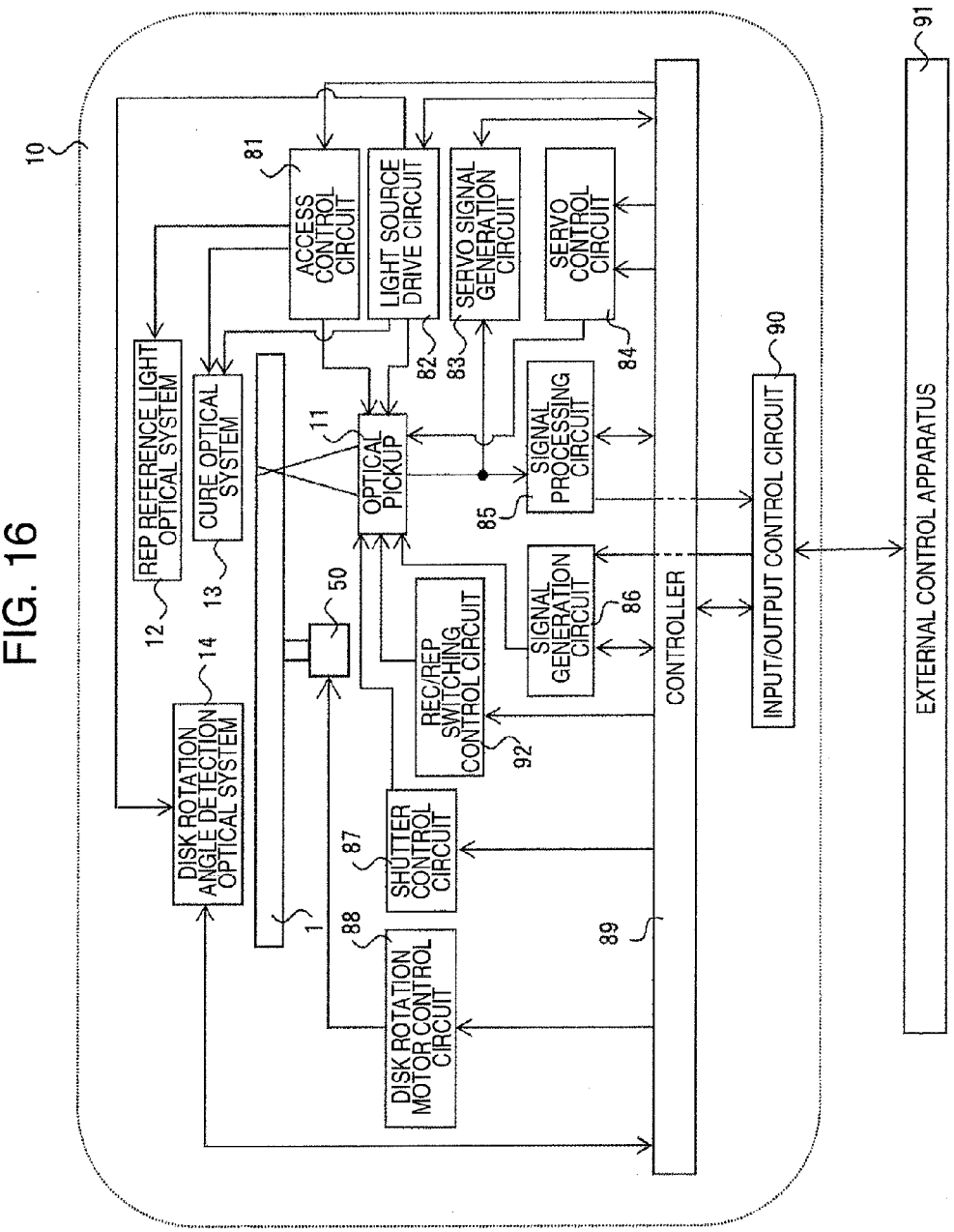
FIG. 16 is a schematic view showing an example of a light information recording/reproducing apparatus.

FIG. 16 is a block diagram showing a recording/reproducing apparatus of an optical information recording medium, which records and/or reproduces digital information using holography.

A light information recording/reproducing apparatus 10 is connected to an external control apparatus 91 via an input/output control circuit 90. At the time of recording, the light information recording/reproducing apparatus 10 receives an information signal to be recorded, from the external control apparatus 91 via the input/output control circuit 90. At the time of reproduction, the light information recording/reproducing apparatus 10 transmits a reproduced information signals to the external control apparatus 91 via the input/output control circuit 90.

The light information recording/reproducing (rec/rep) apparatus 10 includes the optical pickup apparatus 11, a reproduction (rep) reference light optical system 12, a cure optical system 13, a disk rotation angle detection optical system 14, and a rotary motor 50. The optical information recording medium 1 is configured to be able to be rotated by the rotary motor 50.

The optical pickup apparatus 11 serves to irradiate the optical information recording medium 1 with a reference light beam and a signal light beam and to record digital information in the recording medium by using holography. In this case, the information signal to be recorded is sent, by a controller 89, to a spatial light modulator in the optical pickup apparatus 11 via a signal generation circuit 86, and the signal light beam is modulated by the spatial light modulator.

When the information recorded in the optical information recording medium 1 is reproduced, light waves, by which the reference light beam emitted from the optical pickup apparatus 11 is emitted into the optical information recording medium in the direction opposite to the direction at the time of recording, is generated by the reproduction reference light optical system 12. The reproduction light beam, reproduced by the reproduction reference light beam, is detected by a later-described photodetector provided in the optical pickup apparatus 11, and is reproduced, as a signal, by a signal processing circuit 85.

Further, in order to optimize the configuration of the optical system of the optical pickup apparatus 11 at the time of recording and at the time of reproduction, predetermined optical components are controlled via a recording/reproduction switching control circuit 92. For example, since the optical path at the time of recording is difficult from the optical path at the time of reproduction in each of Embodiment 1 to Embodiment 5, the optical path can be switched by driving the ½ wavelength plate 330 to a predetermined position. Further, in each of Embodiment 6 to Embodiment 9, the optical isolator drive mechanism 350, the pinhole drive mechanism 351, and the pinhole diameter changing drive mechanism can be controlled via the recording/reproduction switching control circuit 92 at the time of recording and at the time of reproduction.

The irradiation time of each of the reference light beam and the signal light beam, which irradiate the optical information recording medium 1, can be adjusted by controlling the opening and closing times of the shutter in the optical pickup apparatus 11 with the controller 89 via a shutter control circuit 87.

The cure optical system 13 serves to generate a light beam used for the pre-cure and post-cure of the optical information recording medium 1. The pre-cure means a pre-process in which, when information is recorded at a desired position in the optical information recording medium 1, the desired position is preliminarily irradiated with a predetermined light before being irradiated with the reference light beam and the signal light beam. The post-cure means a post-process in which, after the information is recorded at the desired position in the optical information recording medium 1, the desired position is irradiated with a predetermined light beam so that information cannot be additionally written in the desired position.

The disk rotation angle detection optical system 14 is used for detecting the rotation angle of the optical information recording medium 1. When the optical information recording medium 1 is adjusted to a predetermined rotation angle, a signal corresponding to the rotation angle is detected by the disk rotation angle detection optical system 14. Then, by using the detected signal, the rotation angle of the optical information recording medium 1 can be controlled by the controller 89 via a disk rotation motor control circuit 88.

From a light source drive circuit 82, predetermined light source drive currents are respectively supplied to light sources in the optical pickup apparatus 11, the cure optical system 13, and the disk rotation angle detection optical system 14, and thereby, a light beam with a predetermined amount of light can be emitted from each of the light sources.

Further, each of the optical pickup apparatus 11 and the disk cure optical system 13 is provided with a mechanism which can slide the position of the optical pickup apparatus 11 in the radial direction thereof, and the position is controlled by an access control circuit 81.

Meanwhile, with a recording technique using the principle of angle multiplexing of holography, the allowable error with respect to the shift of the reference light beam angle tends to be very small.

Therefore, it is necessary that a mechanism, which detects the shift amount of the angle of the reference light beam, is provided in the optical pickup apparatus 11, and that a servo mechanism, in which a servo control signal is generated by a servo signal generation circuit 83 and in which the shift amount is corrected by a servo control circuit 84, is provided in the light information recording/reproducing apparatus 10.

Further, the optical pickup apparatus 11, the cure optical system 13, and the disk rotation angle detection optical system 14 may be simplified by combining some or all of the optical system configurations into one unit.

It should be noted that the present invention is not limited to the above-described embodiments and includes various modifications. For example, the above-described embodiments are described in detail in order to better illustrate the present invention, and the present invention is not necessarily limited to those provided with all the configurations described above. Further, a part of the configuration of one of the embodiments can be replaced by the configuration of the other embodiment. Further, the configuration of the other embodiment can be added to the configuration of one of the embodiments. Further, it is possible to perform addition, deletion, and substitution of other configuration in a part of the composition of each of the embodiments.

Specific modifications will be described below.

As modification 1, an optical pickup apparatus, which records/reproduces information into/from an optical information recording medium using holography, is characterized by including at least: a light source that emits a light beam; a switching element that switches the optical path of the light beam between the time of recording and the time of reproduction; an optical isolator that prevents a part of the light beam emitted from the light source from returning to the light source; and an irradiation section that irradiates the optical information recording medium with the light beam, and is characterized in that the optical path is switched by the switching element so that, at the time of recording information, the light beam passes through the isolator, and at the time of reproducing information, the light beam does not pass through the isolator.

As modification 2, in the optical pickup apparatus described in the modification 1, an optical pickup apparatus is characterized in that a pinhole, which removes high frequency noise components of the light beam, is provided only on the recording optical path provided thereon with the optical isolator through which the light beam passes.

As modification 3, in the optical pickup apparatus described in the modification 1, an optical pickup apparatus is characterized in that a first pinhole, which removes high frequency noise components of the light beam, is provided on the recording optical path provided thereon with the optical isolator through which the light beam passes, in that a second pinhole, which removes high frequency noise components of the light beam, is provided on the reproduction optical path without the optical isolator through which the light beam passes, and in that the aperture diameter of the second pinhole is larger than the aperture diameter of the first pinhole.

As modification 4, an optical pickup apparatus, which performs recording/reproduction of information into/from an optical information recording medium using holography, is characterized by including at least: a light source that emits a light beam; an optical isolator that prevents a part of a light beam emitted from the light source from returning to the light source; a control section that controls the position of the optical isolator; and an irradiation section that irradiates the optical information recording medium with the light beam, and is characterized in that, at the time of recording information, the control section arranges the optical isolator on the optical axis of the light beam, and in that, at the time of reproducing information, the control section arranges the optical isolator at a position separated by a predetermined amount from the optical axis of the light beam.

As modification 5, in the optical pickup apparatus described in modification 4, an optical pickup apparatus characterized in that a relay lens, a pinhole which removes the high frequency noise components of the light beam, and a pinhole control section are provided on the optical path through which the light beam passes, in that, at the time of recording information, the pinhole control section arranges the pinhole at a position where the light beam is condensed by the relay lens, and in that, at the time of reproducing information, the pinhole control section arranges the pinhole at a position separated by a predetermined amount from the optical axis of the light beam.

As modification 6, in the optical pickup apparatus described in modification 5, an optical pickup apparatus is characterized by including, instead of the pinhole, a pinhole capable of changing the aperture diameter thereof, and a pinhole diameter control section, and is characterized in that, at the time of reproducing information, the pinhole diameter control section controls the pinhole diameter to be larger than the pinhole diameter at the time of recording information.

As modification 7, in the optical pickup apparatus described in modification 1 or modification 4, an optical pickup apparatus is characterized in that an optical axis correction element, which corrects an optical axis shift generated by switching between recording and reproduction, is provided on the optical path.

As modification 8, the light information recording/reproducing apparatus which performs recording/reproduction of information into/from the optical information recording medium using holography, includes at least the optical pickup apparatus described in one of modifications 1 to 8, and a recording/reproduction switching circuit, mounted on the optical pickup apparatus, for controlling the propagation path of the optical beam, characterized in that the recording/reproduction switching circuit controls the propagation path such that, at the time of recording, the light beam passes through the optical isolator, and such that, at the time of reproduction, the light beam does not pass through the optical isolator.

Further, a part or all of the respective configurations, functions, processing sections, processing means, and the like, described above, may be realized by hardware such as, for example, an integrated circuit. Further, the respective configurations, functions, and the like, described above, may be realized by software in such a manner that processors interpret and execute programs for realizing the respective functions. Information, such as programs, tables, and files, for realizing the respective functions, may be provided in a recording device, such as a memory, a hard disk, and an SSD (Solid State Drive), or in a recording medium, such as an IC card, an SD card, and a DVD.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A light information recording and reproducing apparatus configured, by using holography, to record and reproduce information into and from an optical information recording medium, comprising:
    a light source that emits a light beam;
    a light splitting element that splits the light beam into a first optical path through which the light beam passes at the time of recording information, and a second optical path through which the light beam passes at the time of reproducing information;
    a first optical system that is arranged on the first optical path and includes an optical isolator which includes a faraday element and prevents a part of the light beam emitted from the light source from returning to the light source; and
    a second optical system that is arranged on the second optical path,
    wherein the optical system through which the light beam passes is switched by the light splitting element between the first optical system, such that the light beam passes through the optical isolator at the time of recording information, and the second optical system, such that the light beam does not pass through the optical isolator at the time of reproducing information.

2. The light information recording and reproducing apparatus according to claim 1, wherein:
    the first optical system includes a pinhole which removes high frequency components of the light beam.

3. The light information recording and reproducing apparatus according to claim 1, wherein:
    the first optical system is provided with a first pinhole that removes high frequency components of the light beam;

the second optical system is provided with a second pinhole that removes high frequency components of the light beam; and the aperture diameter of the second pinhole is larger than the aperture diameter of the first pinhole.

4. A light information recording and reproducing apparatus configured, by using holography, to record and reproduce information into and from an optical information recording medium, comprising:

a light source that emits a light beam;

an optical isolator that prevents a part of the light beam emitted from the light source from returning to the light source;

an optical isolator control section that controls the optical isolator, a relay lens on which the light beam passing through the optical isolator enters;

a pinhole that removes high frequency noise components of the light beam; and a pinhole control section that controls a position of the pinhole, wherein, at the time of recording information, the optical isolator control section arranges the optical isolator so that the light beam emitted from the light source enters the optical isolator, and wherein, at the time of recording information, the pinhole control section arranges the pinhole at a position at which the light beam is focused by the relay lens.

5. The light information recording and reproducing apparatus according to claim 4, wherein:

the aperture diameter of the pinhole can be changed; and the pinhole control section controls the aperture diameter of the pinhole so that the aperture diameter of the pinhole at the time of reproducing information is larger than the aperture diameter of the pinhole at the time of recording information.

6. The light information recording and reproducing apparatus according to claim 1, wherein:

the second optical system includes an optical axis correction element that corrects an optical axis shift generated by switching between recording and reproducing.

7. The light information recording and reproducing apparatus according to claim 4, comprising:

an optical axis correction element that corrects an optical axis shift generated by switching between recording and reproducing.

8. A light information recording and reproducing apparatus configured, by using holography, to record and reproduce information into and from an optical information recording medium, comprising:

a light source that emits a light beam;

a light splitting element that splits the light beam into a first optical path through which the light beam passes at the time of recording information, and a second optical path through which the light beam passes at the time of reproducing information; and an optical isolator that includes a faraday element and prevents a part of the light beam emitted from the light source from returning to the light source, wherein the optical path is switched by the light splitting element so that the light beam passes through the optical isolator at the time of recording information, and the light beam does not pass through the optical isolator at the time of reproducing information.

* * * * *